April 11, 1950  F. W. MEREDITH  2,503,346
AUTOMATIC STABILIZING CONTROL SYSTEM
Filed Oct. 21, 1947  2 Sheets-Sheet 2
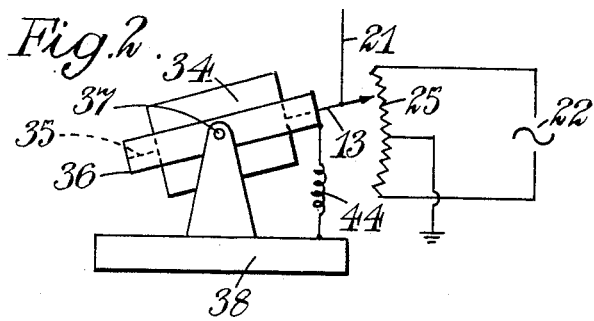
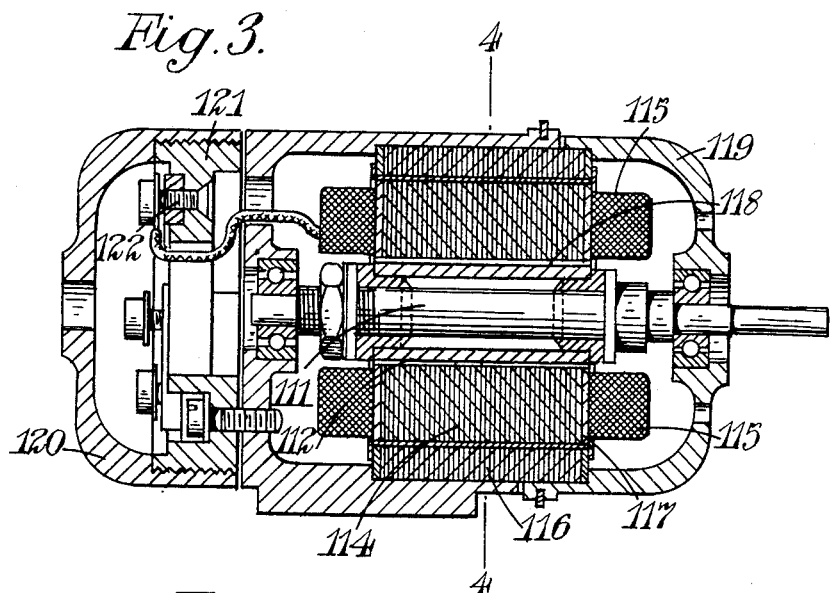
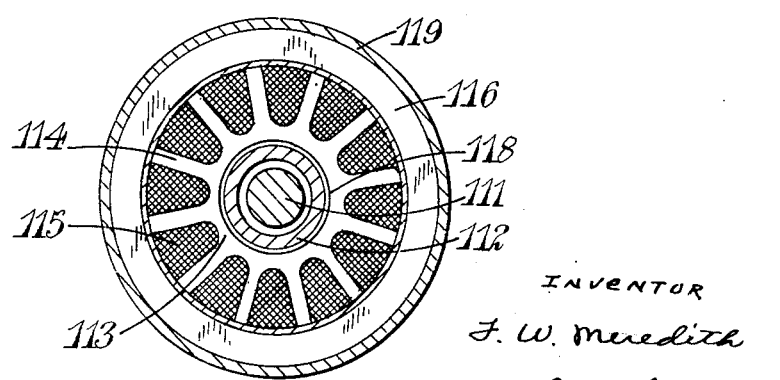
INVENTOR
F. W. Meredith
By Watson, Cole, Grindle & Watson Patented Apr. 11, 1950

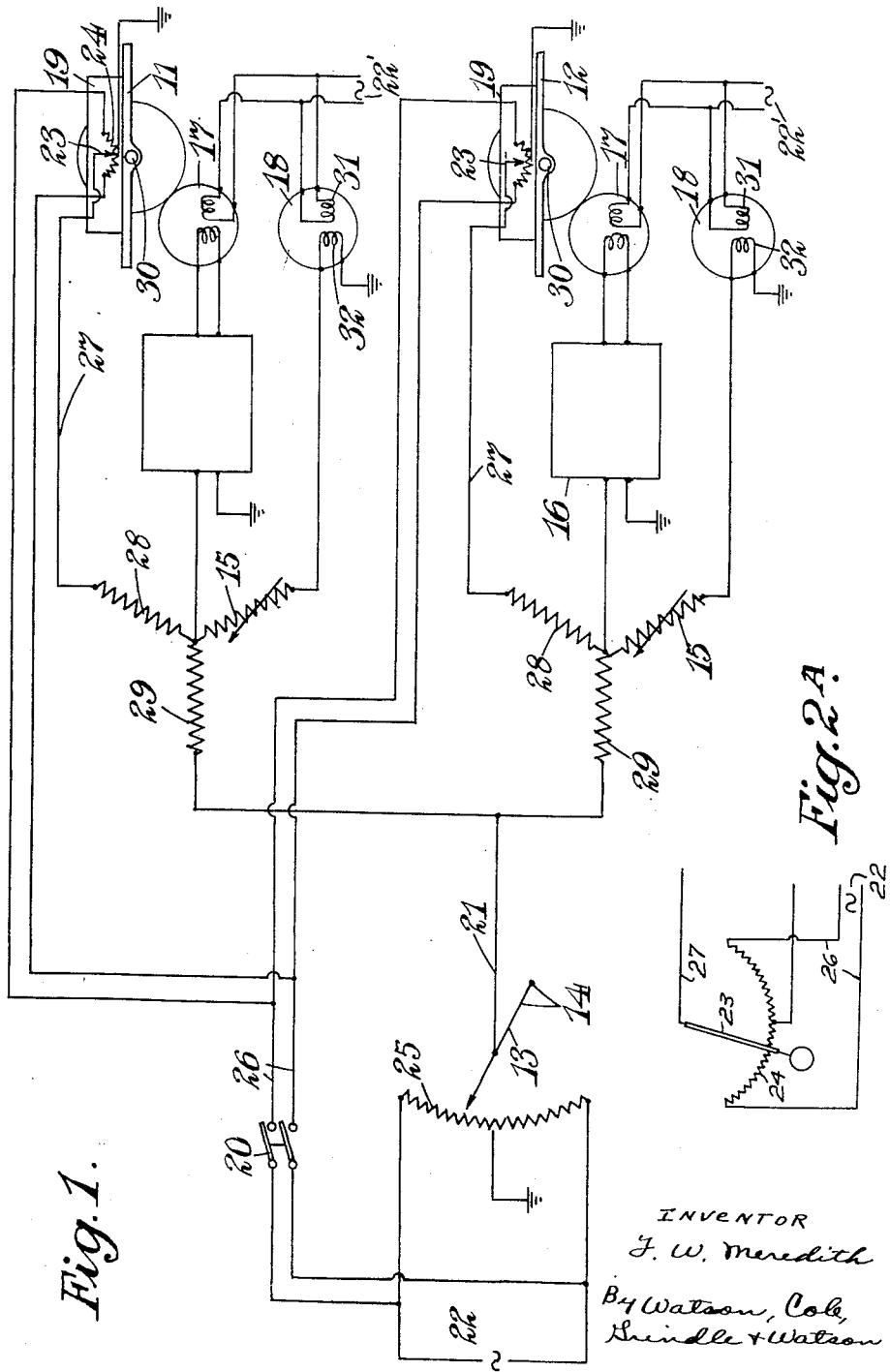

2,503,346

UNITED STATES PATENT OFFICE 2,503,346

AUTOMATIC STABILIZING CONTROL SYSTEM

Frederick William Meredith, London, England, assignor to S. Smith & Sons (England) Limited, London, England, a British company Application October 21, 1947, Serial No. 781,045
In Great Britain October 1, 1943

3 Claims. (Cl. 318—18)

This invention relates to automatic control systems for stabilizing a body against the effects of movements of a second body on which the first is mounted. For example, the second body may be an aircraft and the first body may be a platform mounted thereon, the control system maintaining the platform level in spite of pitching movements of the aircraft.

According to the present invention a device is arranged on the second body to measure the rate of turn thereof and control a motor driving the first body in the opposite direction to the second body at a rate substantially equal to the measured rate of turn. This will ensure that the first body is stabilized but the body may be displaced from its initial or datum position.

According to a further feature of the present invention a monitoring device is arranged on the first body to operate a motor to correct this displacement. This may conveniently be the motor which effects the stabilizing.

By "monitoring device" is meant a device which exerts a control which is substantially ineffective during a short period disturbance of the first body, but is sufficient to restore the first body to its datum position after the disturbance has subsided.

According to a still further feature of the present invention a third body is mounted on the second body and the said rate of turn device controls a motor driving the third body to effect stabilization thereof. A monitoring device may also be arranged on the third body to correct displacement thereof.

The present invention will be more clearly understood from the following description of an example, reference being made to the accompanying drawings in which—

Figure 1 is a schematic drawing showing the stabilising system for two platforms mounted in an aircraft, Figure 2 is a drawing showing a rate of turn gyroscope for use in the system, Figure 2A is a schematic drawing showing the pendulum 23 and its wiring, Figure 3 is a longitudinal sectional elevation of a tachometric signal generator, and Figure 4 is a transverse section on line 2—2 of Figure 3.

In Figure 1, 11 and 12 are platforms mounted on the aircraft. For example, platform 11 may be arranged in the wing tip of an aircraft and may carry a magnetic compass or other device which it is desired to keep away from the influence of other instruments carried on the aircraft, while platform 12 may be arranged in the fuselage and may carry other instruments which have to be stabilised. In this description, the stabilising of the platforms in pitch will be described, it being understood that stabilisation in roll or yaw may be similarly effected.

A rate of turn gyroscope which is responsive to rates of turn in pitch of the aircraft and which will be described in more detail hereafter is mounted in the body of the aircraft. As will be explained, when a rate of turn of the aircraft about its pitch axis occurs the potentiometer slider arm 13, pivoted about a point 14 is caused to move along an arcuate potentiometer resistance 25. The centre point of resistance 25 is earthed and a constant A. C. voltage of reference frequency supplied from a source 22 is applied across the ends of the resistance. L 21 connects the arm 13 to the systems contro .g the movement of the platforms 11, 12.

The A. C. voltage applied across resistance 2ʳ may be of any frequency that is readily availabɩe on the aircraft (e. g. 400 c./s.).

When the gyroscope is not subjected to any rate of turn in pitch the contact on arm 13 is in the central position of the resistance 25 (i. e. it coincides with the earthed point). However, when a rate of turn in pitch occurs the arm is rotated from the central position in a direction in accordance with the sense of the rate of turn and to an amount proportional to the rate of turn. Thus an A. C. signal of the reference frequency and of an amplitude proportional to the measured rate of turn is generated in the lead 21. The phase of this signal is reversed when the contact passes through the centre position of the resistance.

Considering for the moment one only of the platforms 11, 12 and its associated control system (the control system for each platform is identical and corresponding elements of the two systems are numbered alike), the A. C. rate of turn signal is applied through lead 21 and resistance 29, to an amplifier 16. The output from amplifier 16 is applied to one phase of a two phase electric motor 17 in quadrature with the A. C. current of reference frequency supplied to the other phase from the source 22'. Motor 17 drives the turntable 11 about its pitch axis 30 and also drives a tachometric signal generator 18 of known design. One winding 31 of the generator 18 is fed from the A. C. source 22', and an A. C. signal of reference frequency and of an amplitude proportional to the rate at which the generator is driven is generated in quadrature with source 22' in the other winding 32. A tachometric signal generator of this type will be described in more detail hereafter. The induced signal is fed through variable resistance 15 to the input of amplifier 16, the phase of the alternating current applied to winding 31 being such that this induced signal is in antiphase with the signal from the rate of turn gyroscope.

The signal fed back from generator 18 opposes the rate of turn signal and the system will operate in such a manner that the input to amplifier is almost zero, so that the fed back signal will almost equal the rate of turn signal and hence the generator 18 and therefore the motor 17 will rotate at a speed proportional to the measured rate of turn of the aircraft. The higher the gain of amplifier 16, the more nearly is the speed of motor 17 proportional to the measured rate of turn. Provided the generator 18 gives an output proportional to the rate at which it is driven, the motor 17 will operate at a rate nearly proportional to the magnitude of the rate of turn signal whatever is the law of the motor. Resistance 15 is made variable so that the constant of proportionality may be adjusted to any desired value.

The operation of the device as so far described is as follows:

When the aircraft pitches and so tends to rotate the two platforms 11, 12 in pitch, a signal proportional to the rate of turn is generated in lead 21 and applied to the amplifier 16 to cause rotation of the motors 17 at a rate proportional to the generated signal. The motors 17 rotate the platforms 11, 12 in a direction opposite to that in which the pitching of the aircraft is tending to rotate them. By suitable adjustment of resistances 15 the speed of rotation of the platforms in pitch is made substantially equal to the rate of pitch. The two platforms are therefore stabilised in pitch against any pitching disturbances of the aircraft. However, when the pitching disturbance has subsided the platforms 11, 12 may not be horizontal owing to the difficulty of maintaining the synchronism of the motors, flexure of the wings, and the fact that the gain of the amplifier is finite.

To overcome this difficulty each platform carries a monitoring device 19. This consists of gravity controlled arm 23 pivoted at its upper end to be able to swing in pitch. The lower end of the arm 23 travels over an arcuate potentiometer resistance 24 across the ends of which is applied an A. C. voltage of reference frequency obtained from leads 26 connected across potentiometer resistance 25. The pivot point of arm 23 is arranged over the centre (or lowest) point of resistance 24 and this point is earthed. The lead 27 is connected to arm 23 which is made of electrically conducting material. When the platform is horizontal in space the bottom of arm 23 is in contact with the centre point of resistance 24 and no signal is generated in lead 27. However, if the platform is not horizontal an A. C. signal of reference frequency and of an amplitude proportional to the deviation from the horizontal is generated in lead 27. The signal generated in lead 27 is in phase or in antiphase according as the deviation of the platform from the horizontal is in one direction or the other.

The signal generated in lead 27 is applied through resistance 28 to the input of the amplifier 16. The value of resistance 28 is such that the monitoring signal is small compared with signals normally emitted by the rate of turn gyroscope through leads 21. Thus during a disturbance in pitch, the monitoring signal is overridden by the rate of turn signal. When however the disturbance has subsided and the platform has been stabilised, if the platform is not then horizontal, the voltage from the monitor 19 will be sufficient to drive the platform through the motor 17 until the arm 23 is again at its centre position in relation to the resistance 24 and the platform is again horizontal. It will then be seen that the amplifier input voltage is a linear combination of the voltage from the rate of turn gyro 14, the feed-back generator 18 and the monitor 19, the proportions of these in the amplifier input being adjusted by adjustment of resistors 15, 28, 29.

The switch 20 in the leads 26 are provided in order that the monitors 19 may be rendered inoperative during a change in forward speed of the craft which would falsify the indications of the monitor.

If it is desired to stabilise a platform in roll as well as in pitch the platform is mounted on a second platform which is stabilised in roll in the manner indicated, stabilisation in pitch being effected as described. In a similar manner a platform may be stabilised in yaw.

Turning now to Figure 2, the rate of turn gyroscope comprises a rotor 34 mounted on spin axis 35 in a gimbal ring 36 gimballed about an axis 37 on a fixed base 38. Carried by the gimbal ring 36 is the potentiometer contact arm 13 arranged to sweep across the fixed arcuate potentiometer resistance 25 as the ring rotates relatively to the base about the axis 37. The ring 36 is restrained by a spring 41 to a central position in which the arm 13 engages the earthed mid point of the resistance 25. The electrical output of the gyroscope appears in the lead 21 connected to the arm 13.

If the gyroscope is subjected to a rate of turn about an axis normal to the base 38, the gyroscope precesses about the axis 37 against the spring restraint to an extent determined by the magnitude of the rate of turn. As described above, the output appearing in lead 21 is then proportional to the rate of turn.

In order to stabilise the platforms 11, 12 in pitch, therefore, the gyroscope is secured in the aircraft with its base 38 normal to the pitch axis of the craft. The signal applied through lead 21 to the control system for the motors 17 will then be proportional to the rate of turn of the aircraft pitch.

In Figures 3 and 4 there is shown a tachometric signal generator which is suitable for use in this invention. In these figures, the rotor 112 consists of a sleeve of ferromagnetic material of high coercivity. This sleeve 112 is secured to the shaft 111 rotatably mounted on antifriction bearings. The stator is a tubular body of ferromagnetic material of high permeability and of comparatively low coercivity comprising an uninterrupted cylindrical wall 113 and a number (say 12) of equally-spaced radial bars 114 having between them slots 115 which are open at their outer ends and receive the windings (e. g. single-phase exciting windings and single-phase output windings). These bars 114 and slots 115 are embraced by a sleeve 116. The stator 113, 114 and sleeve 116 are laminated to reduce eddy currents. The stator laminations may be held together by end plates 117. Between the cylindrical wall 113 of the stator and the rotor 112 is a narrow air gap 118.

The generator is provided with a casing 119 which houses the sleeve 116 and carries the stator and also carries the bearings for the rotor shaft 111. An end cap 120 for the casing 119 encloses a panel 121 for the terminals 122 of the stator windings.

The present application is a continuation-in-part of my prior application Serial No. 523,348, filed February 21, 1944, now abandoned.

I claim:

1. An automatic control system for stabilizing a first body against the effects of rotational movement of a second body on which the first body is pivotally mounted, comprising an electric motor arranged to rotate the first body relatively to the second body about the axis about the first body to be stabilized, means mounted on the second body for generating a voltage proportional to the rate of turn about said axis, an electric generator driven by said motor and generating a voltage proportional to the speed of the motor, means for applying in opposition the voltage proportional to the rate of turn and the voltage generated by said generator to the input of said motor to drive the second body in the opposite direction to the detected rate of turn, and means for adjusting the relative values of said voltages whereby the second body is rotated at a rate substantially equal to the detected rate of turn.

2. An automatic control system for stabilizing a platform against the effects of movement of a movable craft on which the platform is pivotally mounted comprising a device giving a signal proportional to rate of turn about an axis carried on said movable craft, an electric motor operatively connected to the platform to rotate it about an axis parallel to the said axis, an electric generator operatively connected to the platform and giving an output proportional to the rate of rotation of the platform, an amplifier whose output supplies the aforesaid electric motor and whose input is a linear combination of said rate of turn signal and generator output voltage and means to adjust the relative proportions of said signal and generator output voltages in said amplifier input, said means being adjusted to make the rate of rotation of said platform substantially equal in magnitude and opposite in sign to the rate of rotation of the craft.

3. An automatic control system for stabilizing a platform against the effects of movement of a movable craft on which the platform is pivotally mounted comprising a device giving a signal proportional to rate of turn about an axis carried on said movable craft, an electric motor operatively connected to the platform to rotate it about an axis parallel to the said axis, an electric generator operatively connected to the platform and giving an output proportional to the rate of rotation of the platform, a monitor giving an electric signal in accordance with the amount of rotation of the platform about the said axis from a datum position, an amplifier whose output supplies the aforesaid electric motor and whose input in a linear combination of said rate of turn signal, generator output voltage, and monitor signal and means to adjust the relative proportions of said signal proportional to the rate of rotation of said platform and generator output voltage, said means being adjusted to make the rate of rotation of said platform substantially equal in magnitude and opposite in sign to the rate of rotation of the craft during a disturbance of said craft and said monitor signal causing the motor to operate to restore the platform to its datum position when the disturbance has ceased.

FREDERICK WILLIAM MEREDITH.

REFERENCES CITED

The following references are of record in the file of this patent:

UNITED STATES PATENTS

| Number | Name | Date |
|---|---|---|
| 890,458 | Schley | June 9, 1908 |
| 2,014,825 | Watson | Sept. 17, 1935 |
| 2,115,086 | Riggs | Apr. 26, 1938 |
| 2,168,032 | Japolsky | Aug. 1, 1939 |
| 2,305,878 | Krussmann et al. | Dec. 22, 1942 |
| 2,352,103 | Jones | June 20, 1944 |
| 2,383,461 | Esval et al. | Aug. 28, 1945 |